United States Patent [19]

Scott

[11] Patent Number: 4,935,616

[45] Date of Patent: Jun. 19, 1990

[54] RANGE IMAGING LASER RADAR

[75] Inventor: Marion W. Scott, Albuquerque, N. Mex.

[73] Assignee: The United States of America as represented by the Department of Energy, Washington, D.C.

[21] Appl. No.: 392,878

[22] Filed: Aug. 14, 1989

[51] Int. Cl.$^5$ .............................................. H01J 31/50
[52] U.S. Cl. .................................. 250/213 VT; 356/5
[58] Field of Search ................ 250/560, 561, 213 VT; 356/5; 313/529, 537

[56] References Cited

U.S. PATENT DOCUMENTS

| | | | |
|---|---|---|---|
| 3,495,087 | 2/1970 | Storer | 250/213 VT |
| 3,733,129 | 5/1973 | Bridges | 356/5 |
| 3,761,614 | 9/1973 | Bradley | 313/529 |
| 3,866,052 | 2/1975 | Di Matteo et al. | 250/558 |
| 4,199,253 | 4/1980 | Ross | 356/5 |
| 4,259,017 | 3/1981 | Ross et al. | 356/375 |

Primary Examiner—David C. Nelms
Attorney, Agent, or Firm—James H. Chafin; William R. Moser; Richard E. Constant

[57] ABSTRACT

A laser source is operated continuously and modulated periodically (typically sinusoidally). A receiver imposes another periodic modulation on the received optical signal, the modulated signal being detected by an array of detectors of the integrating type. Range to the target determined by measuring the phase shift of the intensity modulation on the received optical beam relative to a reference. The receiver comprises a photoemitter for converting the reflected, periodically modulated, return beam to an accordingly modulated electron stream. The electron stream is modulated by a local demodulation signal source and subsequently converted back to a photon stream by a detector. A charge coupled device (CCD) array then averages and samples the photon stream to provide an electrical signal in accordance with the photon stream.

9 Claims, 2 Drawing Sheets

RANGE IMAGING LASER RADAR

FIELD OF THE INVENTION

This invention relates to laser radar imaging, and more particularly to a non-scanned laser radar. The United States Government has rights in this invention pursuant to Contract No. DE-AC04-76DP00789 awarded by the U.S. Department of Energy to AT&T Technologies, Inc.

BACKGROUND OF THE INVENTION

Laser radars have performance advantages over microwave radars in certain applications, primarily because of their high angular resolution. However, to search a large field of view with a narrow laser beam in a short time requires a fast, large aperture scanner. Such a scanner is often the component which limits system performance, and the absence of suitable scanners prevents consideration of laser radars for many applications.

To eliminate the need for a scanner while still efficiently utilizing the source power, a detector array can be used in conjunction with a laser which illuminates the entire scene. Square detector arrays of the integrating type, with hundreds of elements in each dimension have been developed for this application. They convert each incoming photon into an electrical charge and store this charge until it is read out. Such detectors are suitable for forming an intensity image. However, the determination of range to a target requires that the laser be modulated and that this modulation be detected. The integrating type of detector does not preserve the intensity modulation of the received optical signal. These considerations indicate why it has heretofore been difficult to fabricate a range imaging laser radar which does not have a scanner.

Nonscanned range imaging laser radar configurations exist in the prior art. In U.S. Pat. No. 3,866,052, differently configured masks establish diverse irradiated segments of the projection field and are used successively. Records made in corresponding succession are examined to identify those records in the succession of records which contain or do not contain a representation of the illumination of each surface point of interest. Digital signal patterns are generated from the record succession, unique for surface points which are in different projection field segments. These signals, together with information as to the positional location of surface points in the two-dimensional records and the spatial location of the recording lens-mode enable transition from two-dimensional data to special position determination. The lens mode and record positional information establish a line of sight to the surface point and the digital signals identify the location of such point along the line of sight.

In U.S. Pat. No. 4,259,017, radiant energy is projected into the projection field with the intensity, or other characteristic, of the radiant energy conforming successively per projection, to plural different patterns, e.g., sine, cosine, or like functions, along an axis transverse to the direction of the projection field. Records are made of object-reflected radiant energy and the line of sight distance to the object surface point is derived from the records.

In U.S. Pat. No. 4,199,253, codes are used to encode the round-trip travel time of a light pulse to and from an object. In one embodiment, plural shutters are cycled in accordance with respective different time patterns by operating the shutters at respective different rates in a common time frame, following issuance of a pulse of light onto an object. The shutter-cycling rate and timing of mutual operation of shutters are controlled such that energy reflected from a plurality of zones of the object is conducted selectively through participating shutters. In another embodiment, a single shutter is employed and is cycled in accordance with respective different time patterns by operating the shutter at respectively different rates following issuance of successive light pulses, cycling rates being such that range information is attained.

Others have proposed the use of a pulsed laser source in conjunction with a gated receiver, much the same as in well known lower frequency, pulsed radars. Implementation of such gated systems is very costly and more practical alternatives are needed.

Accordingly, it is an object of this invention to provide an improved, nonscanning laser radar.

It is a further object of this invention to provide an improved receiver particularly suited for use in a nonscanning laser radar.

It is another object of this invention to provide a nonscanning laser radar with improved range imaging.

SUMMARY OF THE INVENTION

A laser source is operated continuously and modulated periodically (typically sinusoidally) and is used to illuminate a target. A receiver imposes another periodic modulation on the received optical signal, the modulated signal being detected by an array of detectors of the integrating type. Range to the target is determined by measuring the phase shift of the intensity modulation on the received optical beam relative to a reference. The receiver comprises a photoemitter for converting the reflected, periodically modulated, return beam to an accordingly modulated electron stream. The electron stream is modulated by a local demodulation signal source and subsequently converted back to a photon stream by a phosphor. A charge coupled device (CCD) array then averages and samples the photon stream to provide an electrical signal in accordance with the modulated photon stream. The output of the CCD array then contains information about range to the target and can be processed to produce a range image.

DETAILED DESCRIPTION OF THE INVENTION

Figure 1:
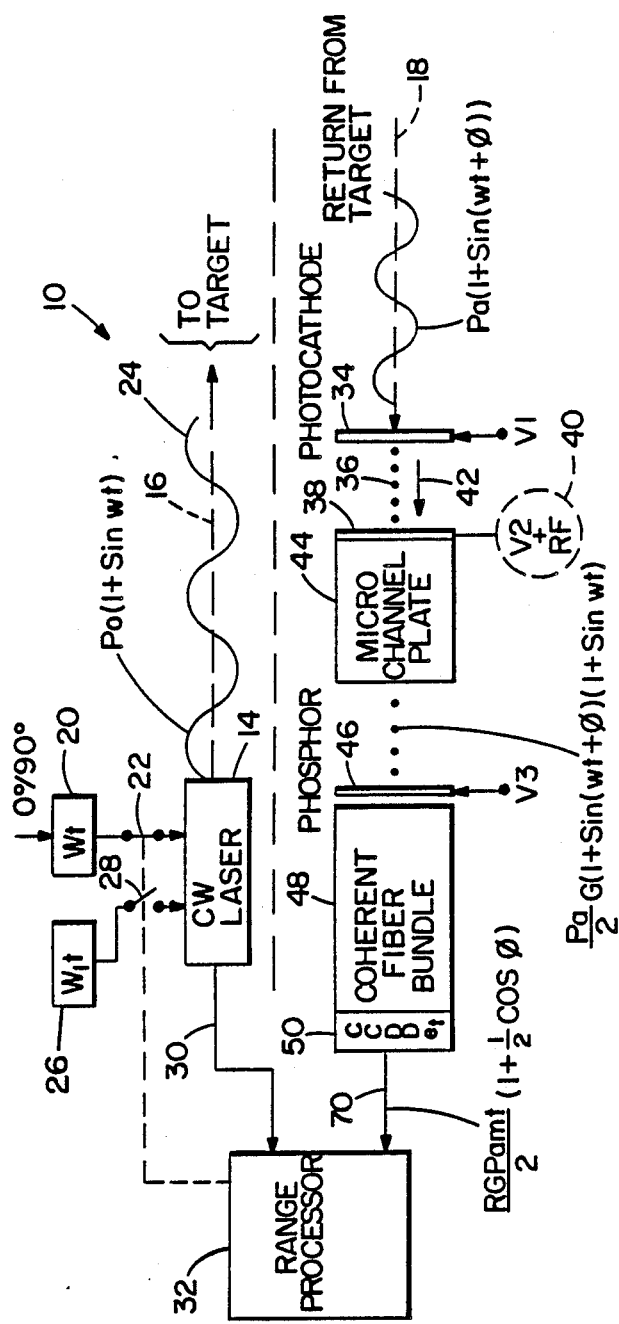
FIG. 1 is a block diagram of the invention.

Referring now to FIG. 1, the range imaging laser radar comprises two portions, a laser transmitter portion 10 and a receiver portion 12. In transmitter 10, cw laser source 14 emits a continuous beam of collimated light 16 in the well-known fashion. Output beam 16 is directed towards a target and its reflections 18 are directed back towards receiver 12.

A sinusoidal source 20 is connected through switch 22 to cw laser 14 and modulates the beam thereof with an amplitude varying sinusoidal modulation 24. A second source of modulating signals 26 is connected through switch 28 to cw laser 14 and provides a different sinusoidal modulating frequency which is particularly useful in a second embodiment of this invention. The frequency of source 20 may characteristically be approximately 75 MHz, whereas the frequency of source 26 may be 82.5 MHz. Output line 30 from cw laser 14 provides a sample of modulated output beam 16 so that range processor 32 may convert the signal into a frequency indication of amplitude modulation 24.

Reflected signal 18 is, as is known, a delayed version of transmitted signal 16, the amount of phase delay being equivalent to the distance of the target from the transmitter/receiver. The return signal 18 is sensed by photocathode 34 which converts its amplitude variations into a modulated electron stream 36. Stream 36 impinges upon a thin conductive sheet 38, where it is modulated (from source 40) by an additional radio frequency signal. A voltage V2 is also imposed upon conductive sheet 38 so that the proper voltage relationship exists between photocathode 34 and conductive sheet 38 to accelerate electron stream 36 in the direction shown by arrow 42. It should be noted that conductive sheet 38 may be configured as an open grid structure to accomplish the modulation. What is required from the modulating structure is that electron stream 36 be amplitude modulated by the signal from source 40 so that the combined modulations are present in the electron stream when it enters microchannel plate 44.

Microchannel plate 44 is of the known electron multiplication type, which through the secondary emission effect amplifies the number of electrons in stream 36. Upon electron stream 36 exiting from microchannel plate 44, it impinges upon phosphor plate 46 which converts the stream back into a photon stream, which photon stream is carried by a coherent fiber bundle 48 to CCD detector 50. The output from CCD detector 50 is applied to range processor 32 for range determination.

Figure 2:
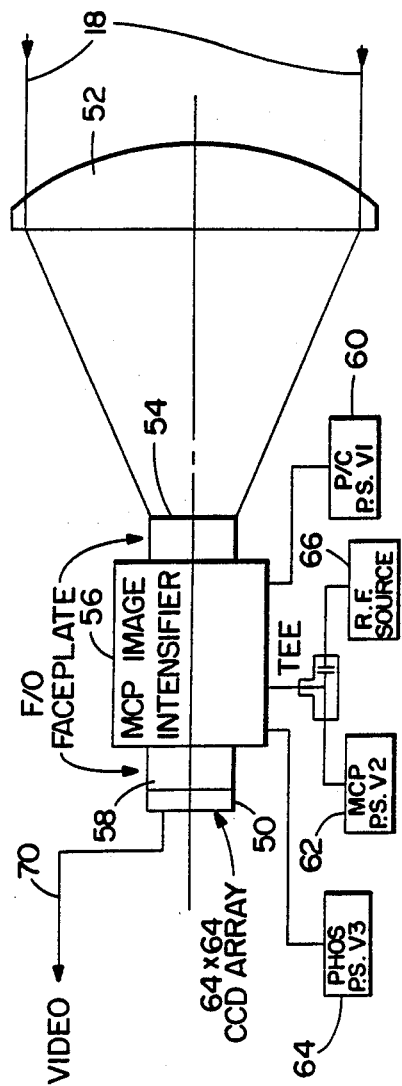
FIG. 2 is a more detailed illustration of an image-intensifier/demodulator employed with the invention.

Referring to FIG. 2, the image intensifier portion of the receiver of FIG. 1 is shown in further detail. Lens 52 focuses the return beam 18 onto face plate 54 of microchannel plate, image intensifier assembly 56. Within assembly 56 are emplaced photocathode 34, modulating conductive sheet 38, microchannel 44, phosphor 46 and coherent fiber bundle 48. CCD array 50 is affixed to the rear face plate 58 of assembly 56. A plurality of power supplies 60, 62 and 64 provide the appropriate bias potentials for each of the units in assembly 56 so that proper electron travel occurs within the unit. RF modulating source 66 is preferably the same frequency as RF modulating source 20 in transmitter 10. The video output from assembly 56 is applied, via conductor 70 to range processor 32 for conversion to digital values and subsequent processing.

As can be seen from the above, the range imaging laser radar of this invention includes a cw laser source which generates sinusoidal or other periodic intensity modulation. The receiver portion includes a front end which comprises an image intensifier camera. The camera is provided with a sinusoidal or other periodic gain modulation capability. An array of integrating type detectors, such as CCD array 50 is provided as the detecting element in the camera. If the gain of the image intensifier camera is modulated at the same frequency as cw laser 14, then the amount of light reaching detector array 50 is a function of the phase difference between the modulation applied to the camera and the intensity modulation of the returning optical beam 18. This is due to the fact that the second intensity modulation that the beam undergoes in image intensifier 56 mixes with the original intensity modulation of beam 18. The phase difference between the two periodic modulations is preserved in the mixing process. When the periodic signals are of the same frequency, the phase information is "mixed" down to 0 frequency or dc. This enables an integrating type detector such as CCD 50 to be employed.

To extract the phase information from the detector output, the image intensifier is preferably operated for a period of time without any modulation. This provides information on the intensity of the received signal so that intensity information can be separated from phase information in the signal processing.

The signal processing technique required to extract range information will now be considered. A laser source can be intensity modulated sinusoidally to give an output transmitter power "P" that can be written as $$P = P_o(1 + \sin(wt)) \quad (1)$$

where "$P_o$" is the average output power from the transmitter and "w" is the modulation frequency. The power collected by the receiver is written as $$P_r = P_a(1 + \sin(wt + \phi)) \quad (2)$$

where "$P_a$" is the average power collected by the receiver and "$\phi$" is the phase difference between the transmitted and received optical signals. The phase "$\phi$" is related to the relative range to the target "r" by $$r = c\phi/(2.0w) \quad (3)$$

where c is the velocity of light. The received optical signal is input to an image intensifier which has a maximum gain "$G_m$" and has a gain modulation capability which enables the intensifier's gain to take the form $$G = G_m(0.5)(1 + \sin(wt)) \quad (4)$$

The output of the image intensifier is detected by an integrating detector with responsivity "R". When the image intensifier is modulated for a period of time equal to an integer multiple (e.g.,"n")of the period of the modulating waveform (T), the output of one of the integrating type detectors at the end of this time is proportional to the quantity "A" expressed below.

$$A = RG_m P_a nT(0.5 + 0.25\cos\phi) \quad (5)$$

If the modulation on the image intensifier is now turned off for the same period of time, the output of the detector at the end of this time will be proportional to the quantity "B" given below.

$$B = RG_m P_a nT \quad (6)$$

Signal processing within range processor 32 is now able to derive the quantity "$\phi$". First, the ratio A/B is formed, giving a number "C" which lies between 0.25 and 0.75. The phase "$\phi$" is related to "C" by the expression:

$$\phi = \arccos(4.0C - 2.0) \quad (7)$$

The phase "$\phi$" contains the desired range information and the range can now be obtained from equation (3).

The system described above has a number of advantages over scanned laser radar systems and pulsed, nonscanned systems. The most obvious advantage is the elimination of the scanner which tends to be large, costly, and very often involves mechanical movements which cause reliability concerns.

Also, because scanners have limited apertures and scan angles, high power sources often cannot be used because they do not have adequate "brightness". In this invention, because the transmitter is not scanned, source brightness is less important. This allows the use of broad area sources, such as stacked arrays of semiconductor lasers. One of the more challenging aspects of traditional phase detection schemes, namely, amplification of signals with large amplitude variations without changing the phase, is no longer required in this invention. The invention has advantages over pulsed systems in that it allows the use of more efficient CW laser sources. The invention also forms the entire range image with only one source and one receiver.

Another advantage of the invention is that there is a natural technique for separating phase and amplitude information in the received signal. This technique removes intensity variations on the return beam as well as responsivity variations across the detector array. Intensity variations in the return beam could be due to variations in reflectivity of the target, or due to non-uniformities in the transmitted beam. Because the system is not sensitive to source non-uniformities, it is more amenable to the use of semiconductor laser array sources.

As will be understood from the above, the basic concept of this invention involves the formation of a range image by periodically modulating both source and receiver so that the intensity of light reaching the detector array is a function of the range to the target. This range is determined by measuring a dc voltage. Measuring the voltage to an accuracy of one part in one hundred with low probability of error requires a voltage signal-to-noise ratio in the hundreds. This high signal to noise ratio can be a problem under certain conditions. To alleviate this problem, signal source 26 (see FIG. 1) is utilized so that two or more signals with different modulation frequencies are transmitted. The connection of modulation sources to cw laser 14 is controlled by switches 22 and 28 (shown schematically) which are in turn controlled by range processor 32.

If range images are formed using frequency f1 from source 20 and f2 from source 26, signal processing can be used to form a range image with the same ambiguity interval that would be obtained by using a much lower frequency. If f1=mf and f2=nf where m and n are relatively prime integers, then the two range images can be combined into one with an ambiguity interval that is characteristic of frequency f. The number of unique resolution elements contained in the processed range image can be as high as the product of the number of elements in the two range images obtained from the transmitted frequencies. This technique enables the system to have the long ambiguity distance associated with the low frequency and the good range resolution associated with higher frequencies.

To obtain a cw system capable of long ranges, it is useful to measure not only the cosine of the phase angle, but also the sine of the phase angle. This is accomplished by modulating the receiver and the transmitter 90 degrees out of phase. When this is accomplished, the sine of the phase angle can be measured in the same manner that the cosine was measured when the two modulations were in phase. This enhances the performance of the system in several ways. First it provides a more accurate measure of phase angle near 180 degrees. A measurement based on the cosine function alone loses accuracy at 180 degrees because the cosine function changes slowly in that vicinity. The second advantage of measuring both sine and cosine is to obtain the full ambiguity distance of one-half the modulation frequency. If measurements are based on the cosine alone, the ambiguity distance shrinks by an additional factor of one-half because the values of the cosine function recur in every 180 degree interval. By measuring the sine also, a full 360 degree interval of phase angles can be unambiguously measured.

To accomplish the above processing, range processor 32 performs the following measurement sequence:

1. First, an image is formed with no modulation to provide a dc base line.
2. An image is then formed with both the transmitter and receiver modulated, in phase, at frequency f1. This accomplishes the measurement of the cosine of the phase angle.
3. An image is then formed with transmitter and receiver modulated ninety degrees out of phase at frequency f1. This accomplishes the measurement of the sine of the phase angle.
4. An image is then formed with the transmitter and receiver modulated, in phase, at frequency f2. This accomplishes the measurement of the cosine of the phase angle.
5. Finally, an image is formed with the transmitter and receiver modulated 90 degrees out of phase at frequency f2, thus accomplishing a measurement of the sine of the phase angle.

The image obtained in step 1 above is used to normalize the other image and to remove the intensity information. The phase values from steps 2 and 3 are then combined, as are the values from steps 4 and 5. Phase readings made when the signal-to-noise ratio is very high will, with high probability, give the same phase reading on both the sine and cosine measurements. However, in long range applications, the signal-to-noise ratio will only be high enough to give a low probability of error for one or the other two readings, depending upon which reading lies in a high measurement accuracy region (region of substantial change). If both readings on a given pixel are in a low accuracy region (region of low change) that indicates that the signal-noise ratio on that pixel was too low for an accurate range measurement and that data point should be rejected.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. In a laser radar wherein a transmitted beam is periodically modulated and a reflection of said beam is sensible after a phase delay dependent upon the range of a target illuminated by said transmitted beam, a ranging receiver comprising:

photo emitter means for converting said reflected beam modulation to an accordingly modulated electron stream;

a demodulation periodic signal source;

modulation means disposed in the path of said electron stream and connected to said demodulation periodic signal source, for modulating said electron stream with a signal from said demodulation periodic signal source;

means for converting said electron stream, as modulated by said modulation means, to a photon signal manifestation thereof; and detector means response to said photon signal manifestation for providing electrical signals indicative of said photon signal manifestation.

2. The invention as defined in claim 1 wherein said transmitted beam is periodically amplitude modulated and said modulation means, amplitude modulates said electron stream.

3. The invention as defined in claim 2 wherein the frequency at which the transmitted beam is modulated and the frequency of said demodulation periodic signal source are the same.

4. The invention as defined in claim 1 wherein said photoemitter means is a photocathode.

5. The invention as defined in claim 4 wherein said modulation means comprises:

conductive means in the path of said electron stream for imposing on said electron stream, an amplitude modulation in accordance with said demodulation signal source; and a microchannel plate for multiplying the modulated electron stream.

6. The invention as defined in claim 5 wherein said detector means comprises phosphor means and a charge-coupled device array, said phosphor means converting said modulated electron stream to a photon signal, said signal being detected by said charge-coupled device array which provides an output electrical signal indicative of said modulation.

7. The invention as defined in claim 6 wherein a coherent fiber bundle is interposed between said phosphor means and charge-coupled device array for photon signal collimation purposes.

8. The invention as defined in claim 3, said reflected beam modulation having periodic portions modulated 90 degrees out of phase with other periodic portions, the combination further comprising:

processor means responsive to the output from said detector means for determining phase information from both said modulated periodic portions of said reflected beam modulation, both the sine and the cosine of the phase angle of said modulated beam thereby being determined.

9. The invention as defined in claim 3 wherein said reflected beam modulation is periodically modulated with frequency f1 and, further, is periodically modulated with frequency f2.

* * * * *